(12) United States Patent
Fournier et al.

(10) Patent No.: US 8,313,080 B2
(45) Date of Patent: Nov. 20, 2012

(54) RETAINING DEVICE FOR ASSEMBLING TWO PANELS, RECYCLABLE FORMWORK FOR FORMING A CONCRETE STRUCTURE AND PACKAGING ASSEMBLY USING THE SAME

(75) Inventors: Andre Fournier, St-Germain (CA); Pierre-Michel D'anglade, Ville Mont-Royal (CA)

(73) Assignee: Abzac Canada Inc., Drummondville (Quebec) (CA)

( * ) Notice: Subject to any disclaimer, the term of this patent is extended or adjusted under 35 U.S.C. 154(b) by 468 days.

(21) Appl. No.: 12/408,230

(22) Filed: Mar. 20, 2009

(65) Prior Publication Data
US 2009/0179137 A1 Jul. 16, 2009

Related U.S. Application Data

(63) Continuation-in-part of application No. 12/032,218, filed on Feb. 15, 2008.

(60) Provisional application No. 60/901,316, filed on Feb. 15, 2007.

(51) Int. Cl.
*B28B 7/00* (2006.01)
*E04G 13/02* (2006.01)

(52) U.S. Cl. ....... 249/48; 249/112; 249/114.1; 249/159; 249/193; 249/194; 249/219.1; 249/164

(58) Field of Classification Search ............. 249/48–49, 249/51, 112–113, 114.1–115, 119–120, 127–128, 249/131–132, 134, 139, 155–157, 159, 164, 249/173, 189, 193–194, 219.1, DIG. 2; 264/32, 333; 52/745.17, 745.18
See application file for complete search history.

(56) References Cited

U.S. PATENT DOCUMENTS

| | | | |
|---|---|---|---|
| 1,039,498 A * | 9/1912 | Deslauriers et al. ............ 249/49 |
| 1,163,375 A | 12/1915 | Selfridge |
| 1,219,272 A | 3/1917 | Edison |
| 2,836,874 A | 6/1958 | Clarkson |
| 3,567,173 A | 3/1971 | Peterson |
| 3,945,601 A * | 3/1976 | Rowley ........................ 249/48 |
| 3,956,437 A * | 5/1976 | Ellis ............................ 264/40.1 |
| 3,990,672 A * | 11/1976 | Buchanan .................... 249/48 |
| 4,083,526 A | 4/1978 | Hatfield |
| 4,767,095 A | 8/1988 | Fitzgerald et al. |
| 4,876,054 A | 10/1989 | Goodwin |
| 4,957,270 A | 9/1990 | Rummage et al. |
| 5,098,059 A | 3/1992 | Sawyer |

(Continued)

FOREIGN PATENT DOCUMENTS

CA 2475085 A1 * 1/2006

(Continued)

OTHER PUBLICATIONS

Translation of EP 0440587, pp. 1-2. Date is not applicable.*

*Primary Examiner* — Dimple Bodawala
(74) *Attorney, Agent, or Firm* — Fish & Richardson P.C.

(57) ABSTRACT

The invention provides a reusable formwork for forming a polygonal upright concrete column using a plurality of retaining devices and a plurality of panels arranged with the retaining devices for providing a forming cavity between the panels adapted to receive concrete therein. Hooping means are used to hoop the panels forming the cavity.

12 Claims, 10 Drawing Sheets

U.S. PATENT DOCUMENTS

| | | | |
|---|---|---|---|
| 5,169,585 A | | 12/1992 | Le Gourrierec et al. |
| 5,216,863 A | | 6/1993 | Nessa et al. |
| 5,226,755 A | * | 7/1993 | Tweedt ............... 403/205 |
| 5,328,142 A | | 7/1994 | Weekers et al. |
| 5,376,316 A | | 12/1994 | Weekers et al. |
| 5,616,271 A | * | 4/1997 | Podgurski ............ 249/48 |
| 5,706,624 A | * | 1/1998 | Lipson ............... 52/745.2 |
| 5,792,552 A | | 8/1998 | Langkamp et al. |
| 5,809,721 A | | 9/1998 | Antropius et al. |
| 6,108,996 A | * | 8/2000 | McGinnis ............ 52/651.02 |
| 6,260,816 B1 | * | 7/2001 | Valero Salinas ........ 249/48 |
| 6,352,382 B1 | * | 3/2002 | Hatlan et al. .......... 403/231 |
| 6,467,749 B1 | | 10/2002 | van de Camp et al. |
| 6,865,859 B2 | * | 3/2005 | Flathau ............. 52/742.14 |
| D583,081 S | * | 12/2008 | Ryan ................. D25/126 |
| 7,556,752 B1 | | 7/2009 | Hicks ................. 264/32 |
| D648,866 S | * | 11/2011 | D'Anglade ......... D25/126 |
| 2002/0179808 A1 | * | 12/2002 | Salinas ............... 249/48 |
| 2003/0000152 A1 | * | 1/2003 | Ryan ................... 52/3 |
| 2003/0218265 A1 | * | 11/2003 | Garcia-Gutierrez ...... 264/35 |
| 2005/0066592 A1 | | 3/2005 | Huber et al. |
| 2005/0229536 A1 | | 10/2005 | Yoshii et al. |
| 2005/0247852 A1 | | 11/2005 | Valero Salinas |
| 2006/0005497 A1 | | 1/2006 | Foell et al. |
| 2006/0016150 A1 | | 1/2006 | Fournier |
| 2006/0032172 A1 | | 2/2006 | Foell et al. |
| 2007/0039691 A1 | * | 2/2007 | Mroz ................. 156/293 |
| 2009/0108170 A1 | * | 4/2009 | Penza ................. 249/48 |

FOREIGN PATENT DOCUMENTS

| | | | |
|---|---|---|---|
| EP | 440587 A1 | * | 8/1991 |
| EP | 0 593 009 A1 | * | 12/1993 |
| EP | 1160393 A1 | * | 12/2001 |
| FR | 2615553 A1 | * | 11/1988 |
| FR | 2616469 A1 | * | 12/1988 |
| GB | 2037583 A | * | 7/1980 |
| WO | WO 8803590 A1 | * | 5/1988 |
| WO | WO 9314287 A1 | * | 7/1993 |

* cited by examiner

RETAINING DEVICE FOR ASSEMBLING TWO PANELS, RECYCLABLE FORMWORK FOR FORMING A CONCRETE STRUCTURE AND PACKAGING ASSEMBLY USING THE SAME

RELATED APPLICATION

The present application is a continuation-in-part of U.S. patent application Ser. No. 12/032,218 filed Feb. 15, 2008, still pending.

FIELD OF THE INVENTION

The present invention generally relates to a retaining device for assembling two panels. The invention relates to formworks for forming concrete structures using such retaining devices, and more particularly concerns a formwork for forming a polygonal upright concrete structure that is recyclable and economical to produce and use. The invention also concerns a packaging assembly for packaging goods using such retaining devices, the packaging assembly being also recyclable and economical to produce and use.

BACKGROUND OF THE INVENTION

All liquid concrete that is still uncured needs to be contained to hold the concrete in place until it hardens sufficiently to hold its own shape. With concrete slabs, the freshly-poured concrete may be retained by existing features such as upright walls, curbs, edgings, etc., or by some form of temporary shuttering also known as a "formwork". The construction of formworks can be quite complicated and expensive, especially on vertical concrete structures such as vertical columns. Indeed, the cost of formworks generally represents a significant proportion of the total cost of the completed concrete structure.

Recently, the use of disposable formworks has been preferred over the use of permanent formworks made of an assembly of wooden or metal stakes, especially when forming vertical concrete structures such as upright columns. After concrete has been cast in a permanent formwork, the wooden or metal stakes cannot be removed before the concrete has at least partially solidified. Unfortunately, the concrete adheres to the stakes of the formwork once it has partially solidified, thus making the stake removal procedure a time-consuming and laborious task.

Many types of disposable formworks have been devised herein to date. For example, disposable formworks made of polystyrene (non-recyclable material) exist, but are plagued with environmental drawbacks. Indeed, when polystyrene formworks are used out in the open on a worksite, wind impinging on the formwork can cause the polystyrene to crumble into granules which eventually become scattered all over the worksite. Moreover, a polystyrene formwork becomes so deteriorated after a single usage that it cannot be used twice. Therefore, pollution occurs each time a polystyrene formwork is used since it must be discarded after a single use but cannot be recycled.

To obviate the environmental drawbacks of using polystyrene, recyclable paperboard has been used in the construction of formworks. Some paperboard formworks generally consist of a paperboard band made of a plurality of laminated paper plies, wound helicoidally to form a cylindrical tube. The inner wall of the tube is coated with a liner of impervious material (e.g. a plastic sheet) to prevent the moisture of the concrete poured and set up in the tube to penetrate across the paperboard and cause the delamination of its plies. Other paperboard formworks are structured from a tubular body composed of a number of assembled parts glued together at their interconnecting edges, and a band of reticulated material, e.g. fibreglass mesh, is rolled up helicoidally around the parts of the tubular body ensuring proper mechanical rigidity of the formwork.

For example, U.S. Pat. No. 6,260,816 discloses a discardable formwork for forming columns that relies on the above principles.

The above-described formworks are however still too expensive to produce and time consuming to remove.

In an attempt to improve over the prior art formworks, in US patent application No. 2006/0016150, the Applicant of the present invention provided an improved paperboard formwork that is recyclable and less expensive to produce.

However, it would be still desirable to provide an improved recyclable formwork that would be easier to use and that would even lower the total cost of the completed concrete structure.

Moreover, in the field of packaging, the use of packaging boxes or assemblies specially devised for specific packaging applications has widely spread during the last few years. These boxes or assemblies are generally manufactured according to specific dimensions required by a particular application, and can generally not be reused for another application.

It would therefore be desirable to provide a new packaging assembly that would be very easy to produce and use at a low cost while being at least partially reusable.

SUMMARY OF THE INVENTION

In accordance with a first aspect of the present invention, there is provided a recyclable formwork for forming an upright concrete column, which is believed to satisfy the above-mentioned need for an improved recyclable formwork. The formwork includes a plurality of retaining devices. Each one of the retaining devices includes an elongated support and a first and a second pair of spaced-apart substantially parallel walls, which extend along the elongated support and project outwardly from the support. The parallels walls provide first and second holding channels extending angularly to each other. The formwork also includes a plurality of panels arranged successively one relative to the other between two successive retaining devices of the plurality of retaining devices. An edge of each panel is snugly fitted into the corresponding channel of the successive retaining devices so as to provide an inside forming cavity between the panels adapted to receive concrete in it. The formwork further includes hooping means for hooping the panels forming the cavity.

By recyclable it is meant that elements of the formwork are preferably made of recyclable materials but also that elements of the formwork can be used more than once. The panels are preferably removably fitted into the channels so that once the concrete poured into the cavity of the formwork has cured, the hooping means can be removed from around the panels, and the panels can be removed from the channels of the retaining devices, making the panels and the retaining devices reusable for forming other concrete columns.

According to a second aspect of the invention, there is provided a kit for assembling a recyclable formwork for forming an upright concrete column. The kit includes a plurality of retaining devices. Each one of the retaining devices includes an elongated support and a first and a second pair of spaced-apart substantially parallel walls. The walls extend along the elongated support and project outwardly from the support for providing first and second holding channels extending angularly to each other. The kit also includes a plurality of panels, an edge of each panel being adapted to be snugly fitted into one of the corresponding channels of one of the retaining devices, so as to provide an inside forming cavity between the panels. The kit further includes hooping means for hooping the panels when they are forming the cavity.

According to a third aspect of the invention, there is provided a method for mounting a recyclable formwork for forming an upright concrete column. The method includes the steps of:
a) providing a plurality of panels, retaining devices and hooping means as defined above;
b) arranging the plurality of panels successively one relative to the other between two successive retaining devices of the plurality of retaining devices, snugly fitting an edge of each panel into the corresponding channel of the successive retaining devices so as to provide an inside forming cavity between the panels; and
c) hooping the panels forming the cavity with the hooping means.

BRIEF DESCRIPTION OF THE DRAWINGS

These and other features and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the present description and the appended claims.

DETAILED DESCRIPTION OF THE DRAWINGS

In the following description, similar features in the drawings have been given similar reference numerals and in order to lighten the figures, some elements are not referred to in some figures if they were already identified in a preceding figure.

The present invention includes a retaining device for assembling two panels that is very easy to manufacture at a low cost. As it will be more easily understood upon reading of the present description, such retaining devices can advantageously be used in a plurality of specific applications.

More particularly, as it will be detailed thereinafter, such retaining devices are advantageously used for providing a formwork for forming a polygonal upright concrete structure that is advantageously recyclable, more easy to use than those of the prior art and more economical to produce and use.

Such retaining devices can also advantageously be used for providing a packaging assembly for packaging goods that is also recyclable and economical to produce and use.

The Recyclable Formwork

Figure 2:
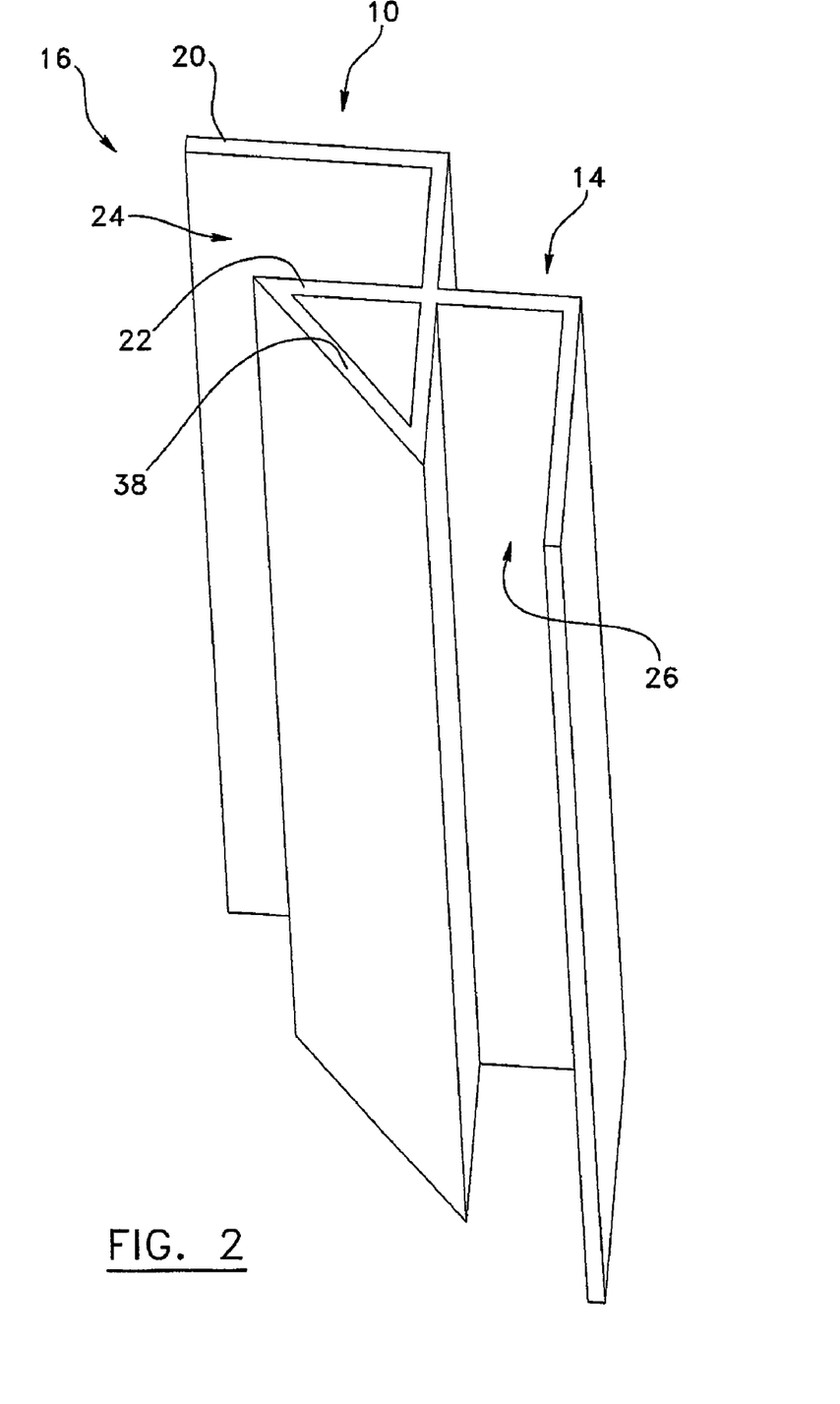
FIG. 2 is a partial elevated perspective view of a retaining device for assembling two panels.
Figure 3:
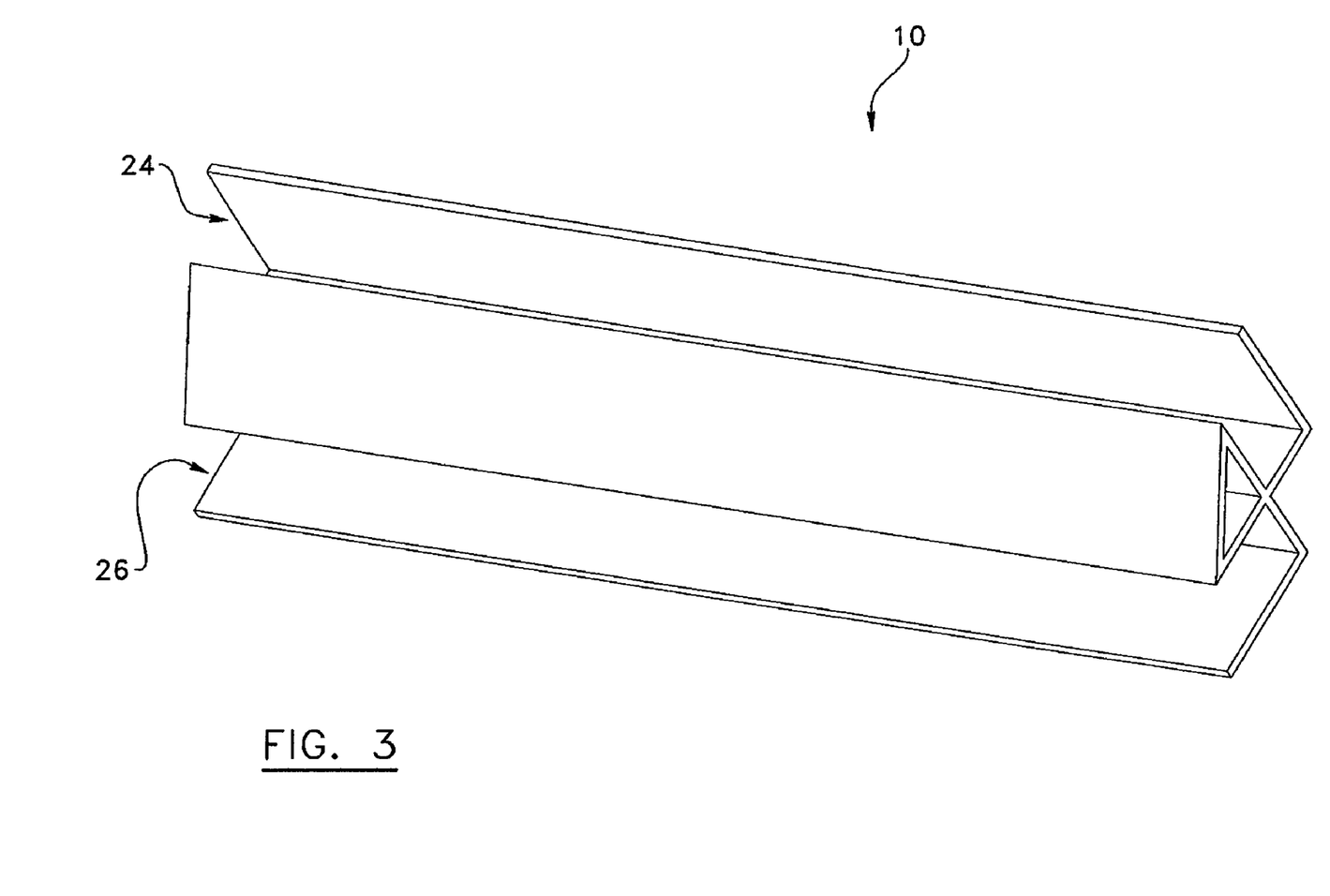
FIG. 3 is another view of the retaining device of FIG. 2.

Referring to FIGS. 2 and 3, there is shown a retaining device 10 for assembling two panels 12 (as better shown in FIG. 5B which will be described in detailed thereinafter). As illustrated, the retaining device 10 is provided with an elongated support 14 and a first and a second pair 16, 18 of spaced-apart substantially parallel walls 20, 22 extending along the elongated support 14 and projecting outwardly therefrom for providing first and second holding channels 24, 26 extending angularly to each other. Each channel 24, 26 is adapted to receive an edge 28 of one of the panels 12 snugly fitted therein to allow assembling of the two panels 12. The retaining device 10 can be made of metal or of plastic but other material such as wood as a non-limitative example can also be envisaged.

Figure 4A:
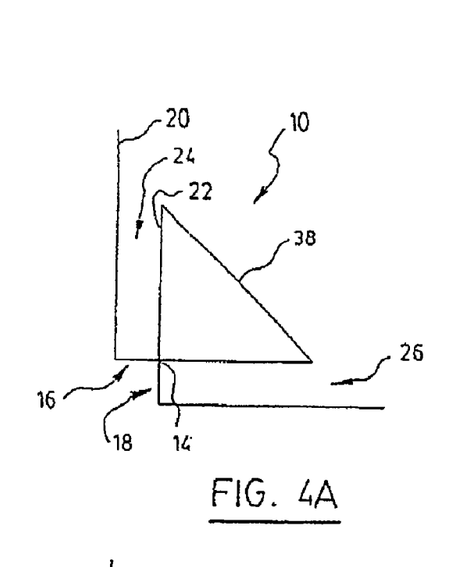
FIGS. 4A to 4F show other preferred embodiments of the retaining device.
Figure 4B:
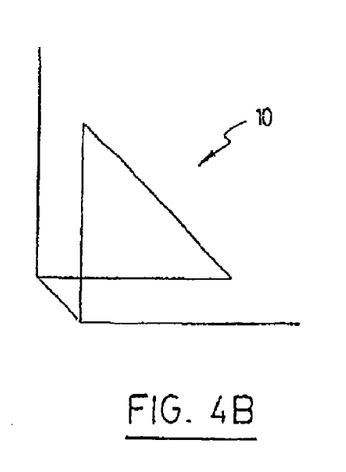
Figure 4C:
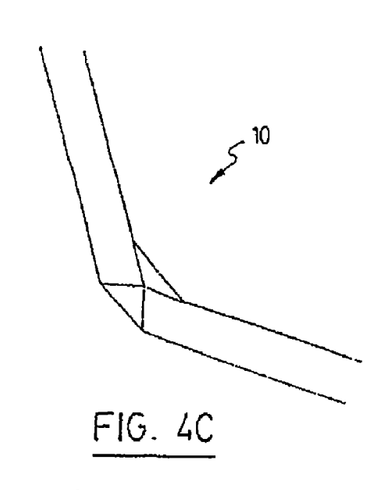
Figure 4D:
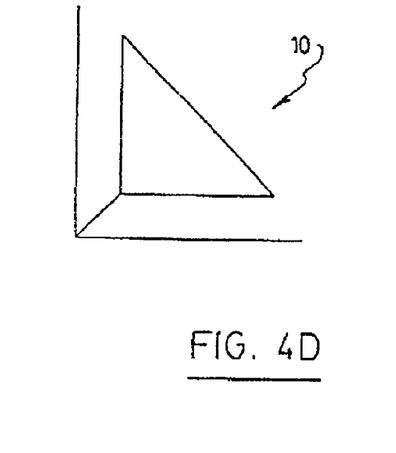

In the embodiment of the retaining device illustrated in FIGS. 2, 3, 4A, 4B, 4D to 4F, and 8 to 16, each of the first and second holding channels 24, 26 extends at substantially 90 degrees to each other, the elongated support 14 being shaped for providing a back wall to each channel 24, 26. This embodiment advantageously allows mounting the two panels 12 at 90 degrees to each other. Of course, the channels 24, 26 can extend at any specific angle required by a particular application. For example, in the embodiment shown in FIG. 4C, the channels 24, 26 form an obtuse angle therebetween. It should also be noted that the channels 24, 26 can extend at substantially 180 degrees to each other on each side of the elongated support 14, as it will be more clearly detailed thereinafter.

Figure 1A:
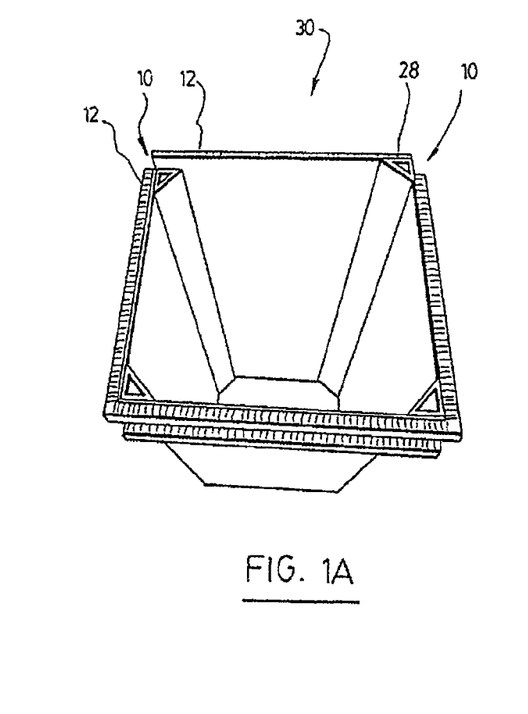
FIG. 1A is an elevated perspective view of a square formwork for forming a square concrete column, according to a preferred embodiment of the present invention, shown without the hooping means.
Figure 1B:
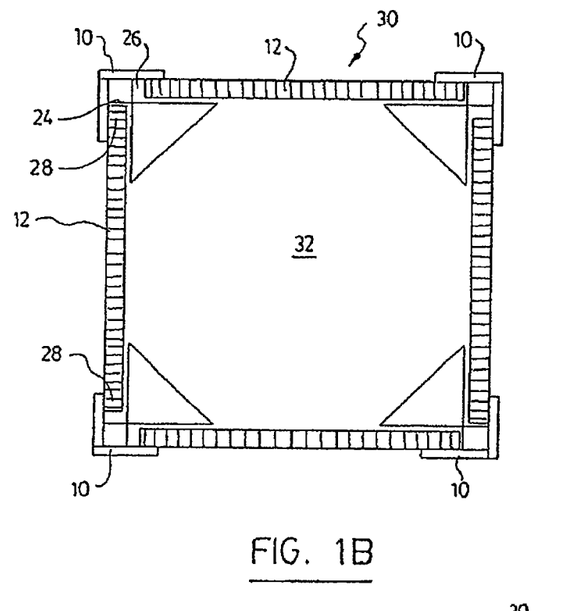
FIG. 1B is a top view representation of the square formwork of FIG. 1A.

Referring now to FIGS. 1A and 1B, there is shown a formwork 30 for forming a polygonal upright concrete structure (not shown) according to a first preferred embodiment of the invention. The illustrated formwork is a square formwork 30 devised to form a square upright concrete structure. The formwork 30 is provided with four retaining devices 10 as described above and as shown in FIGS. 2 and 3. In the illustrated case, the channels 24, 26 extend at 90 degrees to each other. The formwork 30 also has four panels 12 arranged successively one relative to the other between two successive retaining devices 10. As better shown in FIG. 1B, each panel 12 has two opposed edges 28, each being fitted into the corresponding channel 24, 26 of the adjacent retaining device 10 so as to provide an inside forming cavity 32 between the panels 12 adapted to receive concrete therein. Of course, it should be understood that any polygonal shape of the inside forming cavity 32 can be done for a specific application. In this case, the angle between the channels 24, 26 of each retaining device 10 can be chosen according to the specific application. The number of the panels 12 has also to be chosen accordingly.

In this first preferred embodiment, as shown in FIGS. 1A and 1B, the panels 12 are advantageously made of paper-based material, more preferably honeycomb material, in order to provide a greater rigidity to the formwork 30. The use of a plurality of corrugated paperboard sheets stacked together can also advantageously be used to provide the convenient mechanical rigidity to the formwork. As better shown in FIGS. 5A and 5B which shows a second preferred embodiment of the invention, that will be further described thereinafter, the first and second pairs 16, 18 of parallel walls 20, 22 defining the first and second holding channels 24, 26 are preferably particularly shaped so that the distance between the walls 20, 22 substantially corresponds to the thickness of the panels 12. Thus, the edges 28 of the panels 12 advantageously snugly fit in the channels 24, 26, which are then able to retain the panels 12 therein, even when mechanical stress is applied on the panels from the inside forming cavity 32. In the preferred embodiment, it is contemplated that the panels 12 be removably fitted into the channels 24, 26 of the retaining devices 10. However, other arrangements could be considered. Moreover, it should also be mentioned that the width of each wall 20, 22 of each pair of walls 16, 18 or, in other words, the depth of each channel 24, 26 could also be chosen according to a specific application.

Figure 5A:
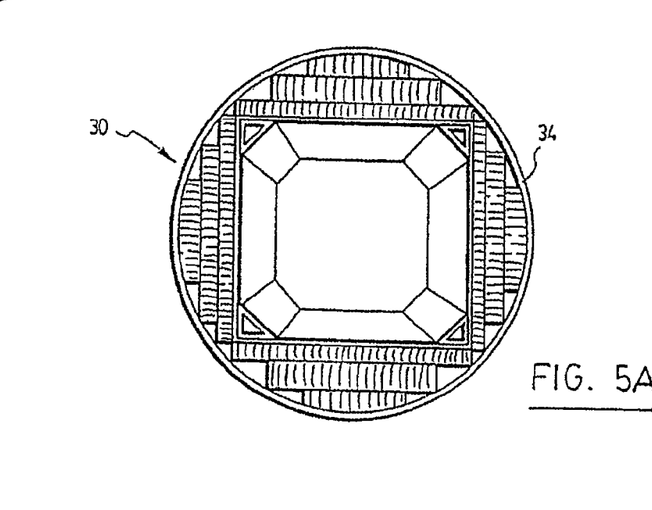
FIG. 5A is a top view of another formwork, according to another preferred embodiment of the present invention.
Figure 5B:
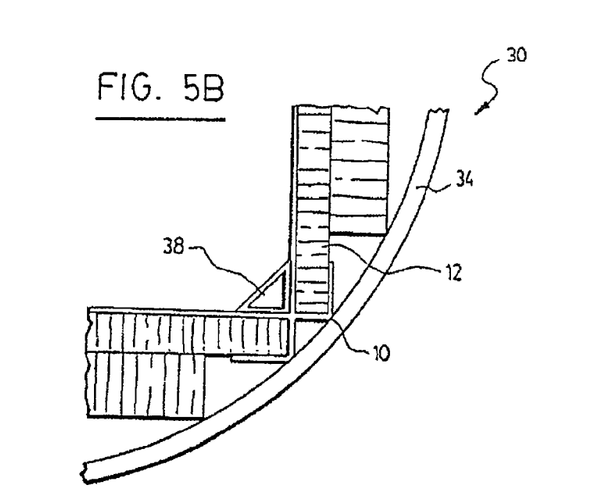
FIG. 5B is a partial enlarged view of the formwork of FIG. 5A.
Figure 5C:
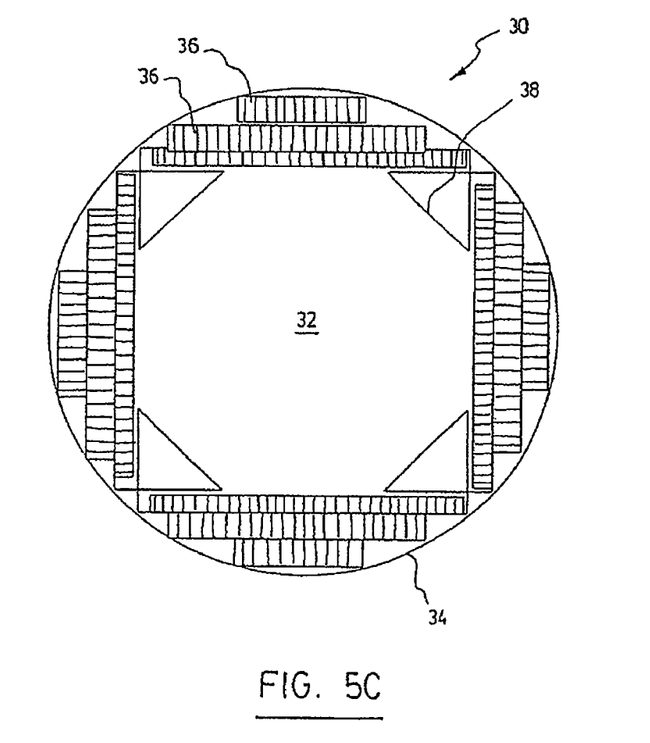
FIG. 5C is a top view representation of the formwork of FIG. 5A.

Referring now back to FIGS. 5A to 5C, when improved mechanical rigidity of the formwork 30 is required, the formwork can advantageously be held together by hooping means, such as a tubular envelope 34, preferably a paperboard tubular envelope, inside which the formwork is nested. In the illustrated embodiment, the formwork 30 is square shaped and the tubular envelope 34 has a cylindrical elongated shape but it should be understood that any other shape could be envisaged for a particular application and is believed to be within the scope of the present invention. As better illustrated in FIG. 5C, in this preferred embodiment, the formwork 30 is also provided with a plurality of paper-based reinforcing elements 36 mountable between an inner side of the tubular envelope 34 and the outer sides of the panels 12. Preferably, the reinforcing elements 36 are made of a plurality of honeycomb or corrugated paperboard sheets stacked together. This preferred embodiment can advantageously withstand higher amounts of mechanical stress.

Indeed, when liquid-form concrete is poured inside the forming cavity of a formwork, the liquid concrete applies substantial pressure on the peripheral surface of the forming cavity. This pressure is of course most important at the base of the formwork, as is the case with any liquid-filled container. Some prior art disposable formworks include a number of wall elements disposed and glued edge to edge. With such prior art formworks, the load arising from concrete-applied pressure is concentrated at the glue joint located between interconnecting edges of the wall elements. This glue joint being generally unable by itself to hold the wall elements together against the weight bias of the freshly-poured concrete, a band of reticulated material, e.g. fiberglass mesh, needs to be added and generally rolled up helicoidally around the wall elements to ensure mechanical rigidity of the formwork. The fiberglass mesh portions overlapping interconnected wall element edges, when liquid-form concrete is poured in the formwork, are nevertheless subjected to very important tensile loads, especially in the base region of the formwork.

Advantageously, with the above described preferred embodiment, the formwork can adequately resist to the load of freshly-poured concrete.

Referring now to FIGS. 7A to 7D, there is shown another preferred embodiment of a formwork 30 of the present invention, wherein the hooping means preferably comprise a plurality of metallic straps 44 tightly surrounding the panels 12. Overlapping ends 46 of the each strap 44 are secured to each other. For example they can be snapped, deformed, gripped or stapled together with specialized pliers, or secured with clips, each strap creating a loop around the panels 12. The number and distance between each strap 44 may vary depending on the cross-section and height of the column to form. Other example of hooping means 40 are polyester straps, paper based envelopes inserted over the panels, meshed or reticulated bands of nylon or fiberglass rolled up around the panels. When polyester straps are used, overlapping ends of each strap are soldered or merged together by applying heat with a specialized heating tool. As can be appreciated, the hooping means 40 can also be made of various materials, as long as the hooping means encircle or surround the panels 12 and prevent the panels from being disengaged from their respective channels 24, 26 when the concrete cures and expands.

The formwork 30 is recyclable or reusable since the same formwork can be used more than once. The panels 12 are preferably removably fitted into the channels 24, 26, so that once the concrete poured into the cavity 32 of the formwork 30 has cured, the hooping means 40 (i.e. the tubular envelope 34 or the straps 44) can be removed from around the panels 12, and the panels 12 removed from the channels 24, 26 of the retaining devices 10, making the panels 12 and the retaining devices 10 of the formwork 30 reusable for forming other concrete columns. The materials used for the retaining devices 10 and the panels 12 are also preferably recyclable materials.

In any of the embodiments, the panels of the formwork 30 can be made of any rigid material, and are preferably made of wood-based material. For example, the panels can be made of pressed wood, plywood, oriented strand board (OSB) or any other type of wood material. Rigid paper-based material may also be considered for the material of the panels 12.

Of course, as previously mentioned, a person well versed in the art would easily understand that the formwork 30 of the present invention is particularly well suited for forming a concrete structure, such as an upright column, of any polygonal shape. In other words, the shape and number of panels 12 could be modified to obtain different shapes of concrete columns. For example, the formwork 30 could comprise six panels 12 of identical dimensions (instead of four as shown in FIG. 5A), arranged edge-to-edge with six retaining devices 10 to form a cross-sectionally hexagonal forming cavity, for forming concrete columns of hexagonal cross-sections. With the present formwork, it is therefore advantageously possible to form columns of different shapes by modifying only the arrangement of the panels.

Figure 4E:
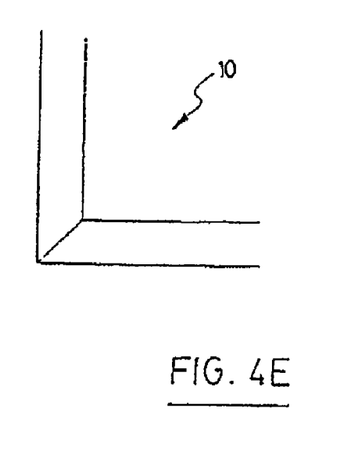
Figure 4F:
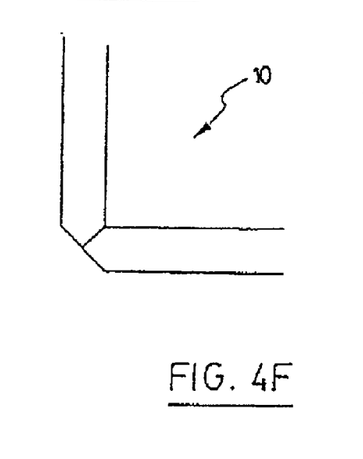

Referring again to FIGS. 1A to 3 and also to FIGS. 5B, 7A and 7B, and 8 to 16 each of the retaining devices 10 of the formwork 30 can advantageously be provided with a forming element 38 extending between the channels 24, 26 inside or outside the forming cavity 32. When inside the cavity 32, the forming elements 38 may serve for forming the concrete structure with bevelled edges at the corners thereof. The forming elements 38 may also serve for providing an added rigidity to the elongated support 14, when they are either inside or outside the cavity 32. In FIGS. 2 and 3, the retaining device 10 is advantageously an extruded plastic device having the forming element 38 extending between the two channels 24, 26, in the corner thereof and therealong. In the illustrated case, the support 14, the channels 24, 26 and the forming element 38 of each retaining device 10 are integral to each others and the forming element 38 has a planar shape. A person well versed in the art would easily understand that this forming element 38 can have any convenient shape required by a particular application. For example, the forming element 38 could have the shape of an arc. This would allow forming, for example, a square concrete column with rounded edges. The retaining devices 10 shown in FIGS. 4A to 4D are provided with a forming element 38 for forming shaped bevels at the corners of the concrete structure while those shown in FIGS. 4E to 4F are not provided with such forming element 38. FIGS. 8 to 16 show other variants of retaining devices.

As described above, the formwork of the present invention is particularly useful for forming polygonal structures but can also be of interest for forming structures having other shapes. For example an oval column could be formed. In this particular case which is not illustrated, the formwork is provided with four retaining devices 10, each holding channel 24, 26 of each retaining device 10 extending at substantially 180 degrees to each other on each side of the elongated support 14. The formwork has first and second panels 12 having a flat shape and third and fourth panels 12 having a semi-circular shape. The panels 12 are arranged in an alternated manner for providing the forming cavity with an oval shape. In this embodiment, a person well versed in the art will understand that the use of a tubular envelope and a plurality of reinforcing elements mounted around the forming cavity is preferable.

In the embodiment just described above, each wall 20, 22 of a pair of walls 16, 18 is parallel and contiguous to a corresponding wall of the other pair of walls. Thus the column formed in the forming cavity has a substantially perfect oval shape. However, a forming element 38 can be added on the walls inside the forming cavity to form a column having an ornamental design.

Figures 7A, 7C:
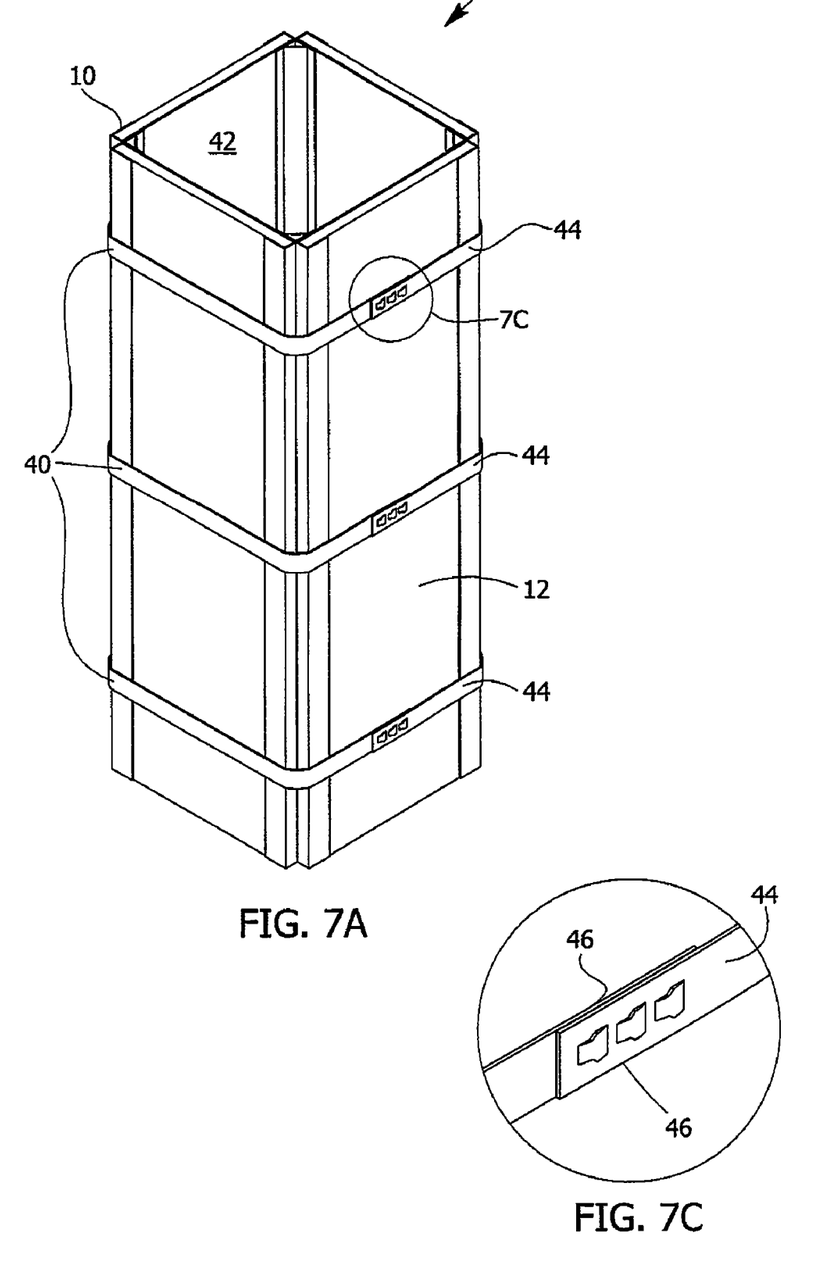
FIG. 7A is an elevated perspective view of a square formwork for forming a square concrete column, according to yet another preferred embodiment of the present invention.
FIG. 7C is a partial enlarged view of section 7C of FIG. 7A.
Figure 7B:
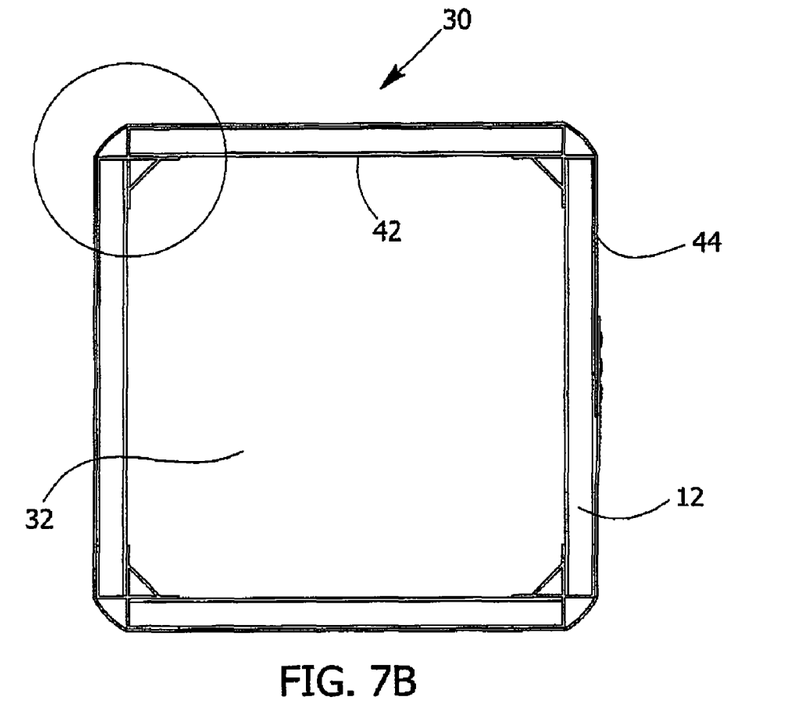
FIG. 7B is a top view representation of the square formwork of FIG. 7A.
Figure 7D:
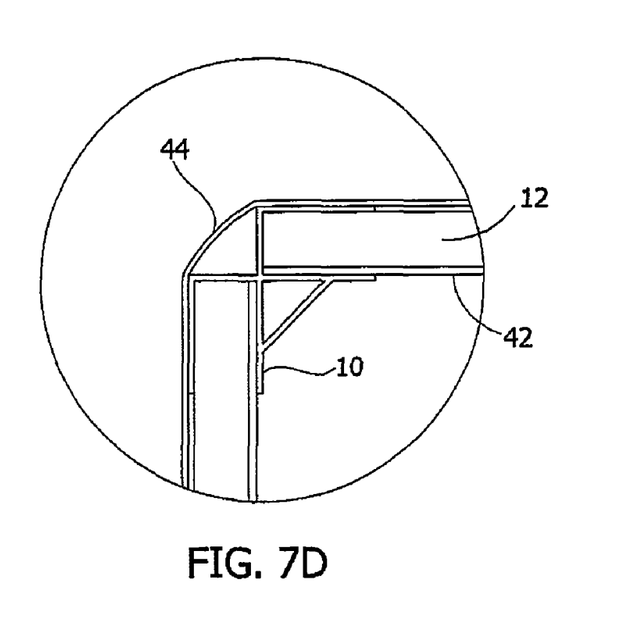
FIG. 7D is a partial enlarged view of section 7D of FIG. 7B.
Figure 8:
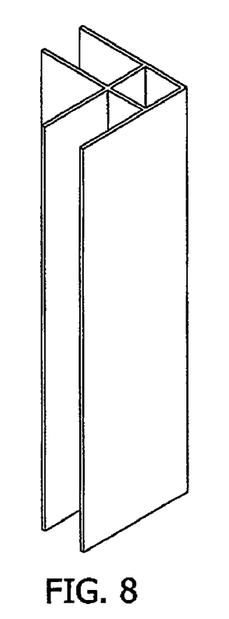
FIGS. 8 to 16 are perspective views of different variants of retaining devices.
Figure 9:
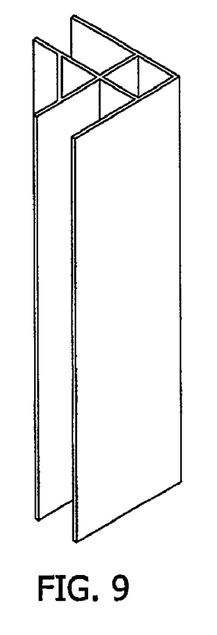
Figure 10:
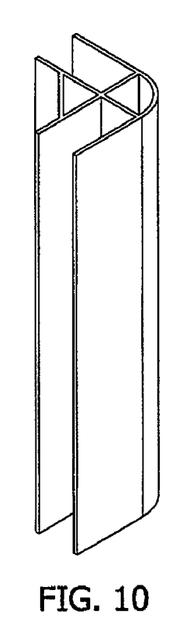
Figure 11:
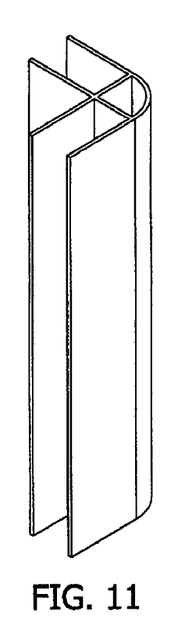
Figure 12:
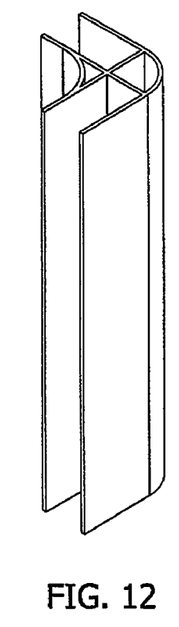
Figure 13:
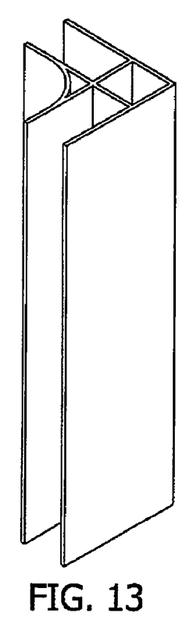
Figure 14:
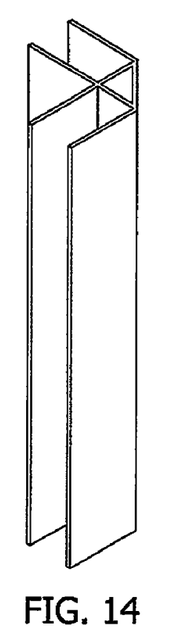
Figure 15:
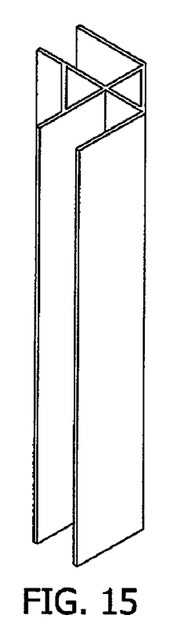
Figure 16:
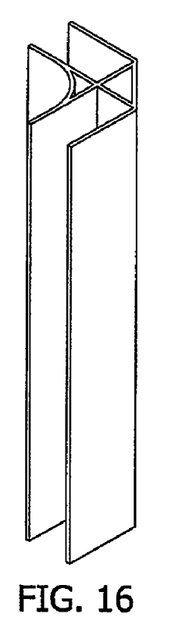

Referring to FIGS. 1A and 1B, and also to FIGS. 7A and 7B, as well known in the art, the inner sides of the panels 12 are advantageously provided with an impervious liner 42, such as a plastic sheet, applied thereto for providing an impervious barrier between the forming cavity 32 and the inner sides of the panels 12. This prevents water escaping from the moist freshly-poured concrete from penetrating into the paperboard or wood board material of the panels 24. This also advantageously greatly facilitates the form removal procedure, preventing concrete to adhere to the rigid panels 12 when curing.

In accordance with a second aspect of the recyclable formwork, and as it will be clearly understood by one skilled in the art, formwork 30 as described above may advantageously be brought to the location at which it is to be assembled in the form of a kit, the kit including an appropriate number of retaining devices 10, panels 12 and hooping means 40 as described above.

The Method for Mounting the Formwork

In accordance with a third aspect of the recyclable formwork, there is provided a method for mounting a recyclable formwork 30 for forming an upright concrete column.

In accordance with this method, there is provided a plurality of panels 12, retaining devices 10 and hooping means 40 as described above.

The plurality of panels 12 are arranged successively one relative to the other between two successive retaining devices 10 of the plurality of retaining devices by snugly fitting an edge of each panel 12 into the corresponding channel 24, 26 of the successive retaining devices 10 so as to provide an inside forming cavity 32 between the panels 12.

More specifically, one would grab a first panel 12 and a first retaining device 10 and insert one of the longitudinal edges of the panel 12 into one of the channel 24 or 26 of the retaining device 10. One would then grab a second panel 12 and insert one of its longitudinal edges into the other channel 26 or 24 of the first retaining device 10. These steps are repeated until a cavity 32 is formed by the panels 12 and the retaining devices 10. Preferably, an impervious liner 42 would be applied first onto the panels 12 prior to inserting them into the retaining devices 10.

The panels 12 forming the cavity 32 are then hooped with the hooping means 40. In the case where hooping means 40 are metallic straps 44, each strap 44 is tightly looped around the panels 12 and overlapping ends 46 of the straps 44 are snapped and deformed with pliers, so that they are securely gripped to one another. In the case where hooping means 40 are polyester straps, each strap is also tightly looped around the panels 12, its overlapping ends being heated together with a heating apparatus so as to solder or merge them together. Straps are preferably regularly spaced along the height of the panels.

Concrete can then be poured into the cavity 32, and once the concrete is cured, hooping means 40 can be removed from around the panels 12 and edges of each one of the panels 12 can be removed from their corresponding channels 24, 26. Panels 12 and retaining devices 10 can then be reused for forming other concrete columns.

The Packaging Assembly

Figure 6A:
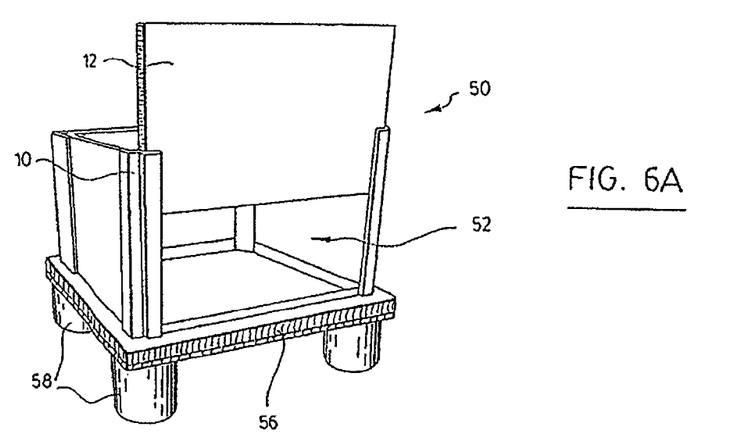
FIG. 6A is a perspective view of a packaging assembly using four retaining devices as shown in FIG. 2, the packaging assembly being partially mounted.
Figure 6B:
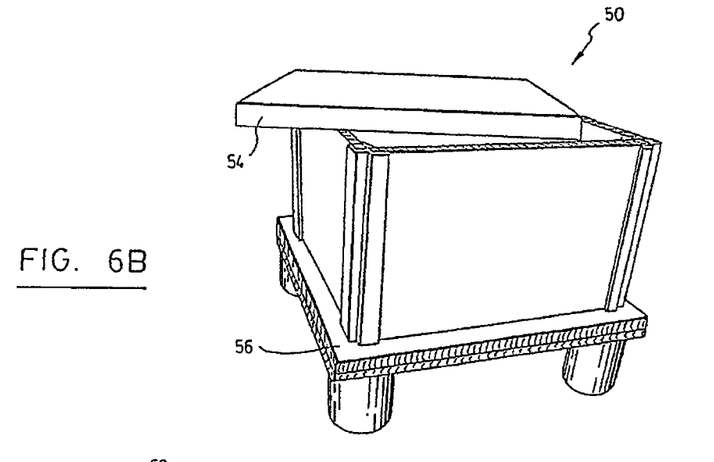
FIG. 6B is another perspective view of the packaging assembly of FIG. 6A, the assembly being provided with a bottom lid and an upper lid.
Figure 6C:
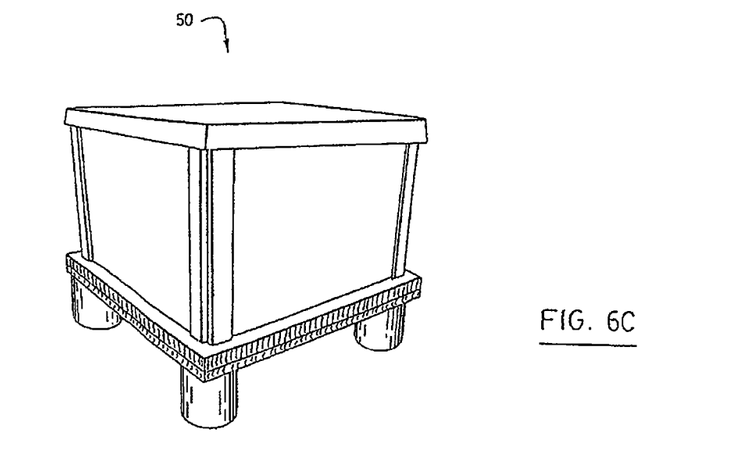
FIG. 6C is another perspective of the packaging assembly of FIG. 6B, the assembly being in a mounted position.

As previously mentioned, according to another aspect of the present invention, there is also provided a packaging assembly for packaging goods. As shown in FIGS. 6A to 6C, the packaging assembly 50 is provided with a plurality of retaining devices 10 as described above and as shown in FIGS. 2, 3, 4A, 4B and 4D to 4F. The packaging assembly 50 also has a plurality of panels 12 arranged successively one relative to the other between two successive retaining devices 10, each being fitted into the corresponding channel 24, 26 of the adjacent retaining devices 10 so as to provide an inside protecting cavity 52 between the panels 12 adapted to receive the goods therein. In the illustrated embodiment, the packaging assembly 50 has four panels 12 and four retaining devices 10 for providing a rectangular assembly, even if other arrangements could also be envisaged. As illustrated in FIG. 6A, the panels 12 are advantageously removably fitted into the channels 24, 26 of the retaining devices 10. This is particularly advantageous since it renders the assembly modular. Thus, some parts can be easily replaced while some others can be reused. Moreover, it also allows to easily dismount the assembly. Thus, the packaging assembly, once dismounted, can be stored in a reduced space.

In the illustrated embodiment, the panels 12 are made of paper-based material, preferably honeycomb paperboard or a plurality of corrugated paperboard sheets stacked together, and the retaining devices 10 are made of extruded plastic to provide a packaging assembly 50 that is entirely recyclable. Of course, the panels 12 can also be made of other materials, such as wood or plastic panels for example. The retaining devices 10 can also be made of wood or metal. The packaging assembly 50 can advantageously be provided with an upper lid 54 and a bottom lid 56 mountable with the protecting cavity 52 for defining a closed protecting cavity. The packaging assembly 50 can also be provided with supporting elements or legs 58 that are particularly mounted so that the packaging assembly 50 can be manipulated like a pallet.

A person well versed in the art to which the invention pertains will easily understand that the proposed packaging assembly 50 is particularly advantageous over those of the prior art: it is heavy duty, economical, very easy to mount and dismount, stackable, reusable and recyclable, while allowing to reduce the costs associated with the manipulation and transport.

Although preferred embodiments of the present invention have been described in detail herein and illustrated in the accompanying drawings, it is to be understood that the invention is not limited to these precise embodiments and that various changes and modifications may be effected therein without departing from the scope of the present invention.

What is claimed is:

1. A recyclable formwork for forming a polygonal upright concrete column, said formwork comprising:
    a plurality of retaining devices, each one of said plurality of retaining devices comprising:
    an elongated support; and
    a first and a second pair of space-apart substantially parallel walls extending along the elongated support and projecting outwardly therefrom for providing first and second holding channels extending angularly to each other;
    a plurality of rigid wood-based flat-shaped panels arranged successively one relative to the other between two successive retaining devices of the plurality of retaining devices, an edge of each panel being snugly fitted into the corresponding channel of the successive retaining devices so as to provide an inside forming cavity between the panels adapted to receive concrete therein, wherein each of said panels is provided with an inner impervious plastic sheet liner; and
    a plurality of straps surrounding said cavity when the panels are forming the cavity, wherein overlapping ends of said plurality of straps are securely gripped to one another, and further wherein the straps being in direct contact with the retaining devices and the panels for hooping the panels and allowing the panels to be retained therein when mechanical stress is exerted on the panels by concrete being poured in the cavity.

2. The recyclable formwork according to claim 1, wherein said retaining device is made of metal or plastic.

3. The recyclable formwork according to claim 1, wherein each of said first and second holding channels extends at substantially 90 degrees to each other, the elongated support being shaped for providing a back wall to each channel.

4. The recyclable formwork according to claim 1, wherein the panels are removably fitted into the channels of the retaining devices.

5. The recyclable formwork according to claim 1, wherein said straps are made of metal.

6. The recyclable formwork according to claim 1, wherein each of said retaining devices is further provided with a forming element extending between the channels.

7. The recyclable formwork according to claim 6, wherein the support, the channels and the forming element of each retaining device are integral to each other.

8. The recyclable formwork according to claim 1, wherein the formwork comprises four retaining devices, each holding channel of each retaining device extending at substantially 90 degrees to each other, the plurality of panels comprising four panels for providing said forming cavity with a rectangular shape.

9. A kit for assembling a recyclable formwork for forming an upright concrete column, the kit comprising:
    a plurality of retaining devices, each one of said plurality of retaining device comprising:
    an elongated support; and
    a first and a second pair of spaced-apart substantially parallel walls extending along the elongated support and projecting outwardly therefrom for providing first and second holding channels extending angularly to each other;
    a plurality of rigid wood-based flat-shaped panels, an edge of each panel adapted to be snugly fitted into one of the corresponding channels of one of the retaining devices so as to provide an inside forming cavity between the panels, wherein each of said panels is provided with an inner impervious plastic sheet liner; and
    a plurality of straps surrounding said cavity when the panels are forming the cavity, wherein overlapping ends of said plurality of straps are securely gripped to one another, and further wherein the straps for being in direct contact with the retaining devices and the panels for hooping the panels and allowing the panels to be retained therein when in use and when mechanical stress is exerted on the panels by concrete being poured in the cavity.

10. The kit according to claim 9, wherein said retaining device is made of metal or plastic.

11. The kit according to claim 9, wherein each of said first and second holding channels extends at substantially 90 degrees to each other, the elongated support being shaped for providing a back wall to each channel.

12. The kit according to claim 9, wherein each of said retaining devices is further provided with a forming element extending between the channels.

* * * * *